United States Patent
Plochocka

(10) Patent No.: US 6,184,325 B1
(45) Date of Patent: Feb. 6, 2001

(54) SOLVENT-FREE, FINE WHITE POWDERS OF HIGH MOLECULAR WEIGHT COPOLYMERS OF MALEIC ANHYDRIDE AND A $C_1$–$C_4$ ALKY VINYL ETHER WITHOUT ODOR OR TASTE

(75) Inventor: Krystyna Plochocka, Scotch Plains, NJ (US)

(73) Assignee: ISP Investments Inc., Wilmington, DE (US)

(*) Notice: Under 35 U.S.C. 154(b), the term of this patent shall be extended for 0 days.

(21) Appl. No.: 09/270,175

(22) Filed: Mar. 16, 1999

(51) Int. Cl.[7] ........................................... C08F 16/12
(52) U.S. Cl. .................... 526/332; 526/78; 526/79; 526/87; 526/271
(58) Field of Search .................... 526/78, 79, 87, 526/271, 332

(56) References Cited

U.S. PATENT DOCUMENTS

| | | | | |
|---|---|---|---|---|
| 4,948,848 | * | 8/1990 | Tazi et al. | 526/78 |
| 5,003,014 | * | 3/1991 | Tazi et al. | 526/78 |
| 5,830,933 | * | 11/1998 | Synodis et al. | 524/37 |
| 6,008,274 | * | 12/1999 | Meyer et al. | 524/1 |

* cited by examiner

*Primary Examiner*—David W. Wu
*Assistant Examiner*—Ling-Siu Choi
(74) *Attorney, Agent, or Firm*—Walter Katz; William J. Davis; Marilyn J. Maue

(57) ABSTRACT

Solvent-free, fine white powders of high molecular weight copolymers of maleic anhydride and $C_1$–$C_4$ alkyl vinyl ethers, which are particularly useful as starting materials for denture adhesives. A solvent-free process for making such copolymers also is described.

10 Claims, No Drawings

SOLVENT-FREE, FINE WHITE POWDERS OF HIGH MOLECULAR WEIGHT COPOLYMERS OF MALEIC ANHYDRIDE AND A $C_1$–$C_4$ ALKY VINYL ETHER WITHOUT ODOR OR TASTE

CROSS-REFERENCE TO RELATED APPLICATIONS

This application is related to application Ser. No. 08/942,830, filed Oct. 2, 1997 now U.S. Pat. No. 5,959,506.

BACKGROUND OF THE INVENTION

1. Field of the Invention

This invention relates to copolymers of maleic anhydride (MAN) and a $C_1$–$C_4$ alkyl vinyl ether (AVE), and, more particularly, to solvent-free, fine white powders of such copolymers having advantageously high molecular weights and without taste or odor, for use in oral care products, particularly denture adhesives, and to a solvent-free process for making such copolymers.

2. Detailed Description of the Prior Art

British Pat. 906,230 described the preparation of copolymers of maleic anhydride and methyl vinyl ether in benzene as solvent. Example 1 also disclosed a copolymerization process in absence of solvent in which powdered maleic anhydride, methyl vinyl ether and initiator were precharged into an autoclave and reacted at 55° C. The specific viscosity (SV) of the product, however, was only 3.45 (1% in methyl ethyl ketone, MEK).

U.S. Pat. No. 5,047,490 described a polymerization process substantially the same as Example 1 of British 906,230. However, the reference does not disclose any procedure for separation of remaining traces of MVE from the product, other than distilling off the MVE from the reactor. Accordingly, such polymers inevitably carry a bad taste and odor which is unacceptable for oral care products such as denture adhesives. Furthermore, the SV of the polymers obtained therein was only 2 to 5.

Accordingly, it is an object of this invention to provide a solvent-free process for making high molecular weight copolymers of MAN and an AVE, particularly having an SV of >6, and which are without taste or odor, so that they can be used advantageously in commercial oral care products such as denture adhesives.

These and other objects and features of the invention will be made apparent from the following more particular description of the invention.

SUMMARY OF THE INVENTION

What is described herein is a solvent-free process for making fine powders of high molecular weight alternating copolymers of maleic anhydride (MAN) and a $C_1$–$C_4$ alkyl vinyl ether (AVE), having a molecular structure of $(A-B)_n$, where A=MAN and B=AVE, and n is an integer which is indicative of its molecular weight.

The copolymers obtained herein have a specific viscosity (SV) which is $\geq 6$ (1% in MEK, 25° C.), corresponding to an absolute weight average molecular weight in excess of 3,500,000 (GPC/MALLS, water pH 9).

The solvent-free process of the invention is carried out by precharging an alkyl vinyl ether in an amount substantially greater than the 1:1 mole ratio required to provide a 1:1 mole ratio of AVE to MAN in the copolymer, adding a free radical initiator, heating the mixture to a reaction temperature of about 50° to 100° C., thereafter feeding molten MAN into the reactor over a predetermined period of time and holding the reactants at a defined temperature for a predetermined time. Unreacted AVE is then stripped off and a stabilizer antioxidant is added to the copolymer and the copolymer is dried.

The high molecular weight copolymers obtained thereby are odorless and tasteless and free of trace amounts of solvents characteristic of other known processes for making such copolymers.

DETAILED DESCRIPTION OF THE INVENTION

In accordance with the invention, there is provided herein a solvent-free process for making solvent-free, fine white powders of high molecular weight copolymers of maleic anhydride and a $C_1$–$C_4$ alkyl vinyl ether, preferably methyl vinyl ether (MVE). In this invention, the specific viscosity (SV) of the solvent-free copolymers is >6 (1% wt/vol in MEK, 25° C.), corresponding to an absolute weight average molecular weight of at least 3,500,000 (GPC, water, pH 9).

The solvent-free polymerization process of the invention is carried out using an excess of alkyl vinyl ether as the reaction medium, preferably by precharging the alkyl vinyl ether into the reactor, adding a radical initiator, heating to a reaction temperature of about 50° to 100° C., and, thereafter, feeding molten maleic anhydride into the reactor over a predetermined period of time, followed by holding at a defined temperature for a predetermined period of time.

An effective amount of a food grade antioxidant stabilizer, such as t-butyl hydroquinone (TBHQ), butylated hydroxyanisole (BHA), butylated hydroxy-toluene (BHT), propyl gallate (PG) and the like, preferably is added to the copolymer product before drying.

After adding stabilizer, the remaining AVE is stripped off, and the polymer is dried at about 40–100° C. under vacuum, to remove any remaining traces of AVE. The desired copolymer is obtained as a solvent-free, fine powder, of desired high SV, and it is odorless and tasteless.

In the preferred embodiments of the process of the invention, the MAN reactant is introduced into the precharged MVE over a period of at least 1 hour and the % solids of the copolymer in the polymerization mixture is about 10–40%. The MVE:MAN mole ratio is maintained at about 25:1 to 5:1, most preferably 12:1 to 7:1. The initiator concentration is 0.01 to 0.2%, most preferably 0.05 to 0.1% by wt., based on the copolymer obtained.

The invention will now be described with reference to the following examples.

EXAMPLE 1

A 1-liter Buchi pressure reactor was sparged with nitrogen and charged with 400 ml (300 g, 5.16 mol) of methyl vinyl ether (MVE) and 0.055 g of Trigonox® 21 (t-butylperoxy-2-ethylhexanoate, Akzo Nobel Chemicals, Inc.), as initiator, a concentration of 0.08% based on copolymer obtained, which was rinsed into the reactor with MVE. The precharged reactor then was heated to 75° C. with agitation over a period of 15 min. Thereafter 41 g (0.418 mol) of molten maleic anhydride MAN (MVE/MAN=12.3 by mol) was fed in over a period of 1 hour. The solids content of the resultant reaction mixture was 16%. The temperature of the mixture was maintained at 75° C. for 1.5 hour. Then 0.03 g t-butyl hydroquinone (TBHQ) antioxidant, rinsed into reactor with 25 ml MVE, was blended into the reaction slurry and the contents were agitated for 15 min. Excess MVE was stripped off whereupon the pressure in the reactor dropped to atmospheric. Upon opening the reactor, a fine, free-flowing copolymer powder product was observed. The product obtained was dried in a vacuum oven at 65° C. for 4 hr. A total of 64.8 g of fine, free-flowing, solvent-free copolymer powder without taste or odor was recovered (99.37% of theoretical yield) which was a 1:1 MVE/MAN copolymer (based on $^{13}$C NMR) having a specific viscosity SV of 10.3 (1% wt/vol, MEK, 25° C.). This specific viscosity corresponds to an absolute $M_w$ of 6,300,000 (GPC/MALLS, water, pH 9).

EXAMPLES 2–5

The procedure of Example 1 was repeated under different reaction conditions. Results similar to Example 1 were obtained.

The Table below is a summary of the experimental conditions and results of Examples 1–5.

TABLE

| Ex. No. | 1 | 2 | 3 | 4 | 5 |
|---|---|---|---|---|---|
| MVE:MAN (mole ratio) | 12.3 | 12.3 | 15.0 | 12.3 | 7.3 |
| Initiator (In) | Trigonox ® 21 | Lupersol ® 11 | Trigonox ® 21 | Decanox ® F | Alperox ® F |
| Conc. of In (% on copolymer) | 0.08 | 0.08 | 0.08 | 0.06 | 0.04 |
| Reaction Temp. (° C.) | 75 | 75 | 75 | 70 | 65 |
| MAN addition Time (hrs) | 1 | 1.5 | 1.5 | 2.0 | 2.0 |
| Total Reaction Time (hrs.) | 2.5 | 2.5 | 3.0 | 3.0 | 3.0 |
| Specific Viscosity Of Copolymer (SV, 1% w/v MEK) | 10.3 | 9.9 | 9.5 | 6.5 | 10.1 |

Appearance of copolymer: The copolymers were solvent-free, fine white powders, without odor or taste

INITIATORS

Trigonox® 21=t-butylperoxy-2-ethylhexanoate (Akzo Nobel Chemicals, Inc.)
Lupersol® 11=t-butylperoxypivalate, 75% in odor free mineral oil (Elf Atochem)
Decanox® F=didecanoyl peroxide (Elf Atochem)
Alperox® F=dilauroyl peroxide (Elf Atochem)

While the invention has been described with particular reference to certain embodiments thereof, it will be understood that changes and modifications may be made which are within the skill of the art. Accordingly, it is intended to be bound only by the following claims, in which:

What is claimed is:

1. Solvent-free, fine white powders of an alternating copolymer of maleic anhydride and a $C_1$–$C_4$ alkyl vinyl ether having molecular structure $(A-B)_n$, where A is maleic anhydride and B is alkyl vinyl ether, and n is an integer indicative of its molecular weight, having a specific viscosity (SV) of >6 (1% wt/vol in MEK, 25° C.), and without odor or taste.

2. A solvent-free process for obtaining solvent-free, fine white powders of high molecular weight alternating copolymers of maleic anhydride and a $C_1$–$C_4$ alkyl vinyl ether, without odor or taste, having the molecular structure $(A-B)_n$, where A is maleic anhydride and B is alkyl vinyl ether, and n is an integer indicative of the molecular weight of the copolymer, and a specific viscosity >6 (1% w/vol in MEK, 25° C.), which consists essentially of precharging excess alkyl vinyl ether over the desired 1:1 mole ratio of A:B in the copolymer into a reactor, adding 0.01 to 0.1% by weight based on copolymer of a free radical initiator, heating the mixture to a reaction temperature of about 50° to 100° C., feeding molten maleic anhydride into the thus-charged reactor over a predetermined period of time, holding at about 50° to 1000° C., adding a food grade antioxidant stabilizer, stripping excess alkyl vinyl ether from the reaction product, and drying the copolymer obtained of any remaining traces of alkyl vinyl ether.

3. A solvent-free process according to claim 2 wherein said alkyl vinyl ether is methyl vinyl ether.

4. A solvent-free process according to claim 3 wherein the mole ratio of methyl vinyl ether to molten maleic anhydride is about 25:1 to 5:1.

5. A solvent-free process according to claim 2 wherein molten maleic anhydride is fed into the precharged reactor over a period of at least 1 hour.

6. A solvent-free process according to claim 2 wherein the initiator concentration is 0.05 to 0.1% based on copolymer.

7. A solvent-free process according to claim 2 wherein the % solids of the copolymer present during the polymerization is about 10 to 40%.

8. A solvent-free process according to claim 4 wherein said mole ratio is 12:1 to 7:1.

9. A solvent-free process according to claim 2 wherein said stabilizer antioxidant is t-butyl hydroquinone.

10. A solvent-free process according to claim 2 wherein the drying step is carried out at 40° to 100° C. under vacuum.

* * * * *